US006054862A

United States Patent [19]

Zhou

[11] Patent Number: 6,054,862

[45] Date of Patent: Apr. 25, 2000

[54] VACUUM CHAMBER BAKEOUT PROCEDURE FOR PREVENTING ION GAUGE FAILURE

[75] Inventor: Jiaxiang Zhou, Austin, Tex.

[73] Assignee: Applied Materials, Inc., Santa Clara, Calif.

[21] Appl. No.: 08/921,810

[22] Filed: Sep. 2, 1997

[51] Int. Cl.[7] ..................... G01N 27/62

[52] U.S. Cl. ..................... 324/464; 324/460

[58] Field of Search ..................... 324/464, 460; 134/21; 219/496; 118/726

[56] References Cited

U.S. PATENT DOCUMENTS

| | | | |
|---|---|---|---|
| 3,674,984 | 7/1972 | Coats et al. | 219/496 |
| 4,534,204 | 8/1985 | Berquist | 73/1.58 |
| 4,569,829 | 2/1986 | Shih | 422/247 |
| 4,866,640 | 9/1989 | Morrison | 364/558 |
| 5,443,368 | 8/1995 | Weeks | 417/27 |
| 5,536,330 | 7/1996 | Chen | 134/21 |

OTHER PUBLICATIONS

Kendall, "cold cathode gauges for ultrahigh vacuum measurements", J. Vac. Sci. Tech. 15(3), May/Jun., p. 740,1997.

Akimichi, "Calibration of an axial symmetric transmission gauge in ultrahigh and extreme high vacuum", J. Vac. Sci. Tech. A 15(3), p. 753, May 1997.

*Primary Examiner*—Josie Ballato
*Assistant Examiner*—T. R. Sundaram
*Attorney, Agent, or Firm*—Thomason, Moser & Patterson

[57] ABSTRACT

A method for performing a bakeout test on a vacuum chamber without causing the ion gauge to fail turns the ion gauge off when it is not needed, even during part of the time that the chamber is held at a high vacuum, so as to minimize the opportunity for contaminants to react with and damage the ion gauge filament. Specifically, the method turns the gauge off when any heating elements in the chamber are turned on, so the added heat does not exacerbate the problems with reactions with the filament. Thus, the method turns the gauge off when the chamber is too hot. In one embodiment, the method employs a heating jacket to keep the gauge and its adapter from forming a cold spot at which water vapor can condense during part of the test.

37 Claims, 7 Drawing Sheets

VACUUM CHAMBER BAKEOUT PROCEDURE FOR PREVENTING ION GAUGE FAILURE

BACKGROUND OF THE INVENTION

1. Field of the Invention

The present invention relates generally to testing vacuum systems for a qualifying vacuum. More specifically, the present invention relates to a procedure for performing a bakeout test on a vacuum chamber, such as the chambers used to manufacture integrated circuits on silicon wafers, so that the ion gauge used for measuring the pressure in the vacuum system at a high vacuum does not fail during the test.

2. Background of the Related Art

Vacuum systems are generally known. The manufacture of integrated circuits requires that many manufacturing procedures be performed within a vacuum system. A physical vapor deposition (PVD) chamber is one vacuum system used in the manufacturing of integrated circuits. The vacuum level that a PVD chamber must be able to attain is on the order of $6.0\times10^{-9}$ torr.

PVD chambers are subjected to a vacuum test to determine the qualifying vacuum pressure for the chamber after the chamber is constructed. Several problems could prevent a chamber from reaching its qualifying pressure, including a leak in the chamber or pump, a leak in the bakeout lamps, or a slow pump. On the other hand, it is possible for a chamber to reach its qualifying pressure, but not show it because of a failed pressure gauge. A typical pressure gauge used at the low pressures of a PVD vacuum system is a Bayard-Alpert ionization gauge (ion gauge), but other types of gauges may be used.

A typical vacuum test, or bakeout procedure, begins with a fully assembled system including a chamber, bakeout lamps, wafer heater, pump section and the measuring devices used to monitor the system's performance during and after the test. The pump section may have more than one pump, including a roughing pump and a high vacuum pump such as a cryogenic pump, a getter pump or a turbomolecular pump.

Initially, the roughing pump is used to pump the system down for about five to ten minutes from atmospheric pressure to about 100 mtorr, close to the limit of a typical roughing pump. Then the pumping action is switched to the high vacuum pump. The high vacuum pump cannot operate at pressures much higher than 100 mtorr, thus the need to use a roughing pump to do the initial pump-down. The high vacuum pump may initially pump the system down for about ten to fifteen minutes to a test pressure of about $3.0\times10^{-6}$ torr, and eventually achieve the qualifying pressure at about $6.0\times10^{-9}$ torr after the bakeout. The ion gauge must be turned on at this time to measure the high vacuum in the chamber.

The ion gauge measures the pressure when the high vacuum pump is on. In fact, the ion gauge may not operate properly at the higher pressures prior to switching the pumping action to the high vacuum pump. Therefore, it has become standard practice to turn the ion gauge on when the high vacuum pump is turned on and leave it on during the entire part of the bakeout procedure when the high vacuum pump is on.

The high vacuum pump may hold the high vacuum pressure or ultra high vacuum pressure for the duration of the test. During the test, the bakeout lamps may be turned on to help the chamber degas for about 32 hours. The central wafer heater is initially left off, so it won't suffer too much oxidation. After the initial degassing time with just the bakeout lamps, the wafer heater may also be turned on for about four hours to confirm that it operates and to complete the degassing of the chamber and of itself. After the required time for the bakeout, the bakeout lamps and the wafer heater may be turned off so the chamber can cool down for about twelve to fifteen hours.

After the chamber has cooled down, the pressure is read from the ion gauge to determine if the chamber has reached its qualifying pressure. If the ion gauge has become contaminated in the bakeout process, then it will not show the correct pressure. Instead, it will most likely show a much higher pressure than exists in the chamber, giving the indication that the chamber may have failed the vacuum test. A key indicator that the ion gauge may have failed is that the chamber pressure did not reach its qualifying pressure, but the rate of rise of the pressure is good and no leak can be found in the pump section. Experience has shown that chamber failures due to contaminated ion gauges have been as common, and frequently more common, than failures due to leaks in the chambers.

If a gauge fails, then it has to be replaced, which increases cost of ownership of the vacuum system. Also, the chamber may have to be re-tested, another added cost. Furthermore, the time required to troubleshoot the chamber to determine that it was the gauge that caused the failure, further delays operation of the vacuum system and increases costs.

It is, therefore, desirable to have a method of performing a vacuum system bakeout test that more reliably tests a chamber and avoids failure of the ion gauge.

SUMMARY OF THE INVENTION

A method for performing a bakeout test on a vacuum chamber which reduces diagnostic device failure includes turning the diagnostic device off during at least part of the time that the chamber is maintained at a high vacuum. Additionally, the method preferably turns the pressure gauge on while any heating elements are off, and turns the pressure gauge off while any heating elements are on. The method also preferably turns the pressure gauge on when the chamber is cool enough, and turns the pressure gauge off when the chamber is too hot. In another embodiment, the method also uses a heater for heating the pressure gauge adapter until the chamber temperature cools to a threshold temperature.

The method turns the pressure gauge on and leaves the heating elements off while pumping the chamber down to a high vacuum. Then the first part of the bakeout test leaves the gauge off, while also leaving the heating element off. Otherwise, the heating element is on during the first part of the test. Additionally, there is another wafer heater that is off during the first part of the test. Then during the second part of the test, the heating element is on, while the gauge is left off. Additionally, there is another wafer heater that is also on during the second part of the test. Then the vacuum system is cooled down while turning the gauge on. Then the method keeps the gauge on until the chamber has qualified.

Additionally, the bakeout procedure employs a heating jacket on the pressure gauge adapter to keep it warm during part of the test.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Generally, the preferred embodiment for performing a vacuum test in such a manner that the ion gauge in the vacuum system does not fail includes turning off the ion gauge when it is not needed. Thus, most of the contaminants that might damage the ion gauge can be removed during the vacuum test before the gauge is turned on. If the ion gauge has to be turned on early in the test, before most of the contaminants can be removed, then the ion gauge should be turned on for only a short period of time and then turned off until it is needed again. Additionally, the preferred embodiment makes sure to turn any heating element off during any time that the ion gauge is turned on in the system. Thus, the problems caused by the contaminants in the system will not be exacerbated by the heat, as will be described below.

Figure 1:
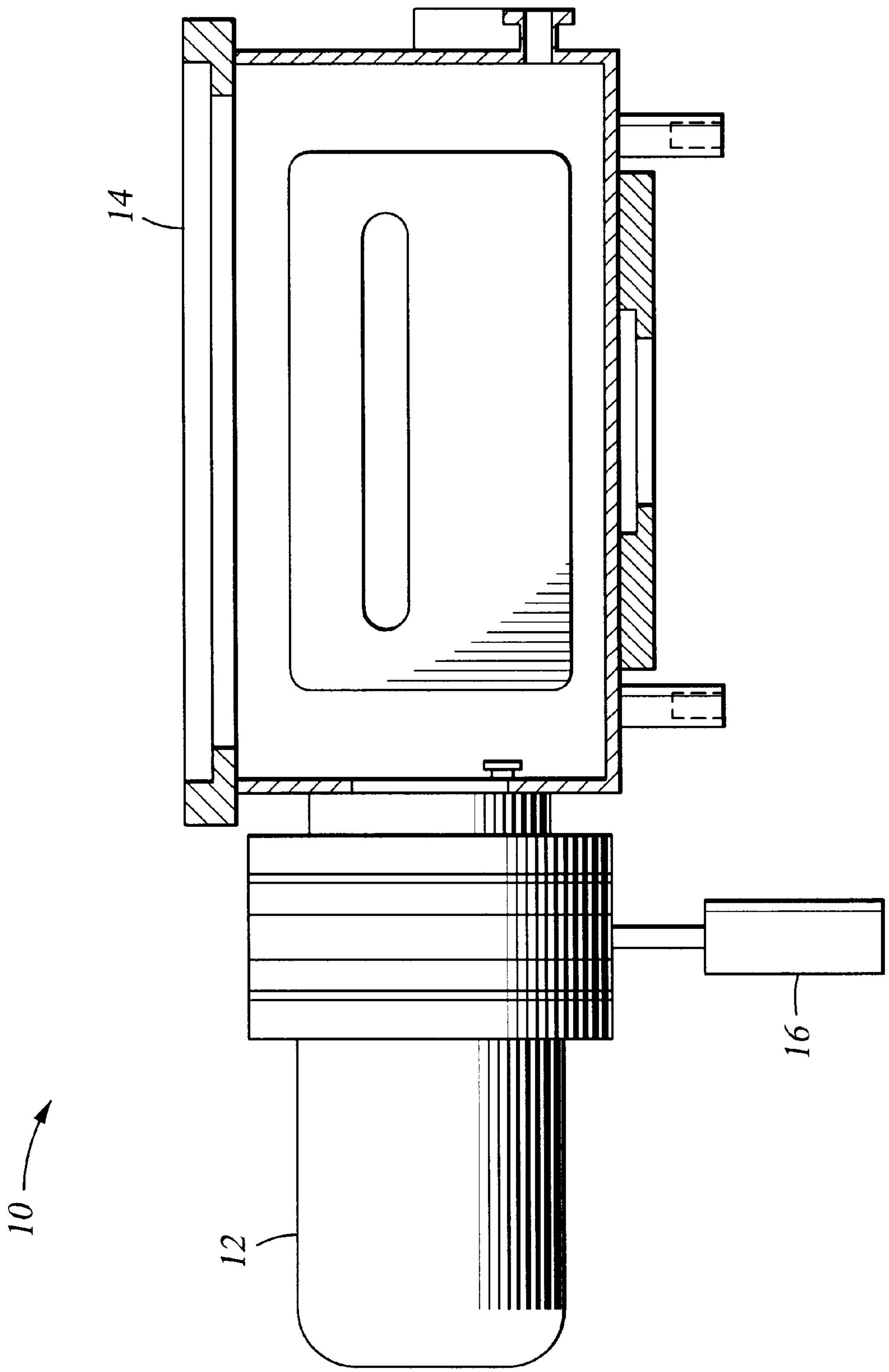
FIG. 1 is a vacuum system that may be used with the present invention.

FIG. 1 generally shows a vacuum system 10, which may incorporate the present invention, having a pump 12 mounted on a chamber 14. A gate valve 16 generally separates the pump 12 and the chamber 14. When gate valve 16 is open, the pump 12 and the chamber 14 are in communication with each other; and when gate valve 16 is closed, the pump 12 and the chamber 14 are isolated from each other.

The vacuum system 10 may be any kind of system that has a pump that reduces the pressure of the chamber. The described embodiment relates to any vacuum system used in manufacturing IC's on silicon wafers, including a physical vapor deposition (PVD) vacuum system, a chemical vapor deposition (CVD) vacuum system, an etch vacuum system, etc. The described embodiment specifically shows a PVD vacuum system, but it is to be understood that the present invention is not restricted to this one embodiment.

Pump 12 may include a pump for high vacuum pumping. Additionally, a roughing pump is connected through a foreline to chamber 14 in a known manner. Except where specifically noted, references to a pump in this description are to the high vacuum pump since the vacuum test described herein operates in the high vacuum region. High vacuum pumps include a cryogenic pump (sometimes called a cryopump), a turbomolecular pump, and a getter pump. In the following description, the invention is described as including a cryopump; however, it should be understood that any other type of high vacuum pump could be used in accordance with the present invention.

When gate valve 16 is open, the pump can pump down chamber 14 and maintain both sections in a high vacuum. When gate valve 16 is closed, the pump will usually continue to try to maintain the high vacuum; but since it is cut off from its pump, the vacuum in chamber 14 has nothing to maintain it, so the pressure in the chamber can rise if there is a source for gases to enter it. In fact, it is expected that small amounts of gases may continue to desorb from the interior surfaces of the chamber causing a normal rise in the chamber pressure when the gate valve is closed. A failure in chamber 14, however, may cause its pressure to rise unacceptably.

Chamber 14 may include an ion gauge, not shown, for measuring the low pressures in the chamber 14 at which most other gauges cannot operate. The ion gauge may also show the change in pressure over time. When gate valve 16 is open, the ion gauge shows the pressure in both chamber 14 and pump 12. When gate valve 16 is closed, the ion gauge shows the pressure only in chamber 14.

Figure 2:
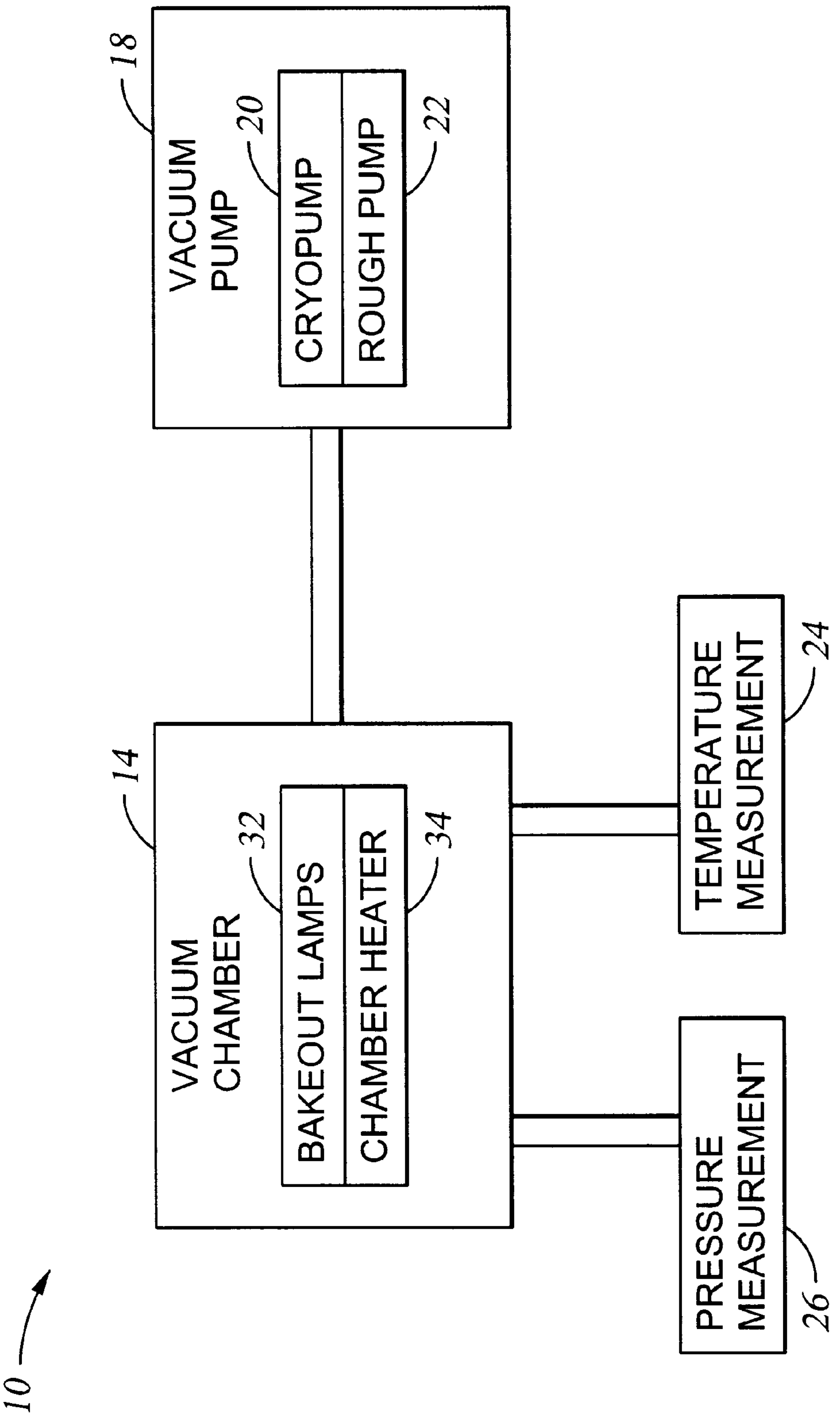
FIG. 2 is a schematic of a vacuum system.

Chamber 14 may also include one or more bakeout lamps, as shown in FIG. 2. A typical bakeout lamp contains about 99% Ar and about 1% $N_2$. The lamps may be used during bakeout and during actual manufacturing of IC's on the wafers.

Vacuum chambers typically have a lid for an operator to access the interior of the chamber. The lid is typically sealed to the chamber with an O-ring. An O-ring, however, does not provide the best seal possible for a vacuum chamber, because water vapor and other gases can permeate through an O-ring into the vacuum chamber. There are other ways to seal a vacuum chamber that provide a much better seal, but these other ways require much more time to open and close the vacuum chamber, which is unacceptable in commercial uses, where speed is important. Therefore, vacuum chambers used in the semiconductor industry accept the O-ring seal. The presence of water vapor in the vacuum system causes a problem which the current invention overcomes as will be described below.

FIG. 2 shows a schematic of the parts of a vacuum system 10. Chamber 14 has lamps 32 as described above, and a wafer heater 34. The pressure measurement 26 for chamber 14 may be an ion gauge as described above. The temperature measurement 24 for chamber 14 may be any suitable device, such as a thermocouple. Vacuum pump 18 may be a system of one or more pumps. Vacuum pump 18 is part of pump 12 and is shown with a cryopump 20 and a rough pump 22 as described above. Alternatively, the rough pump 22 connects directly to the chamber 14 rather than going through the pump 12.

Figure 3:
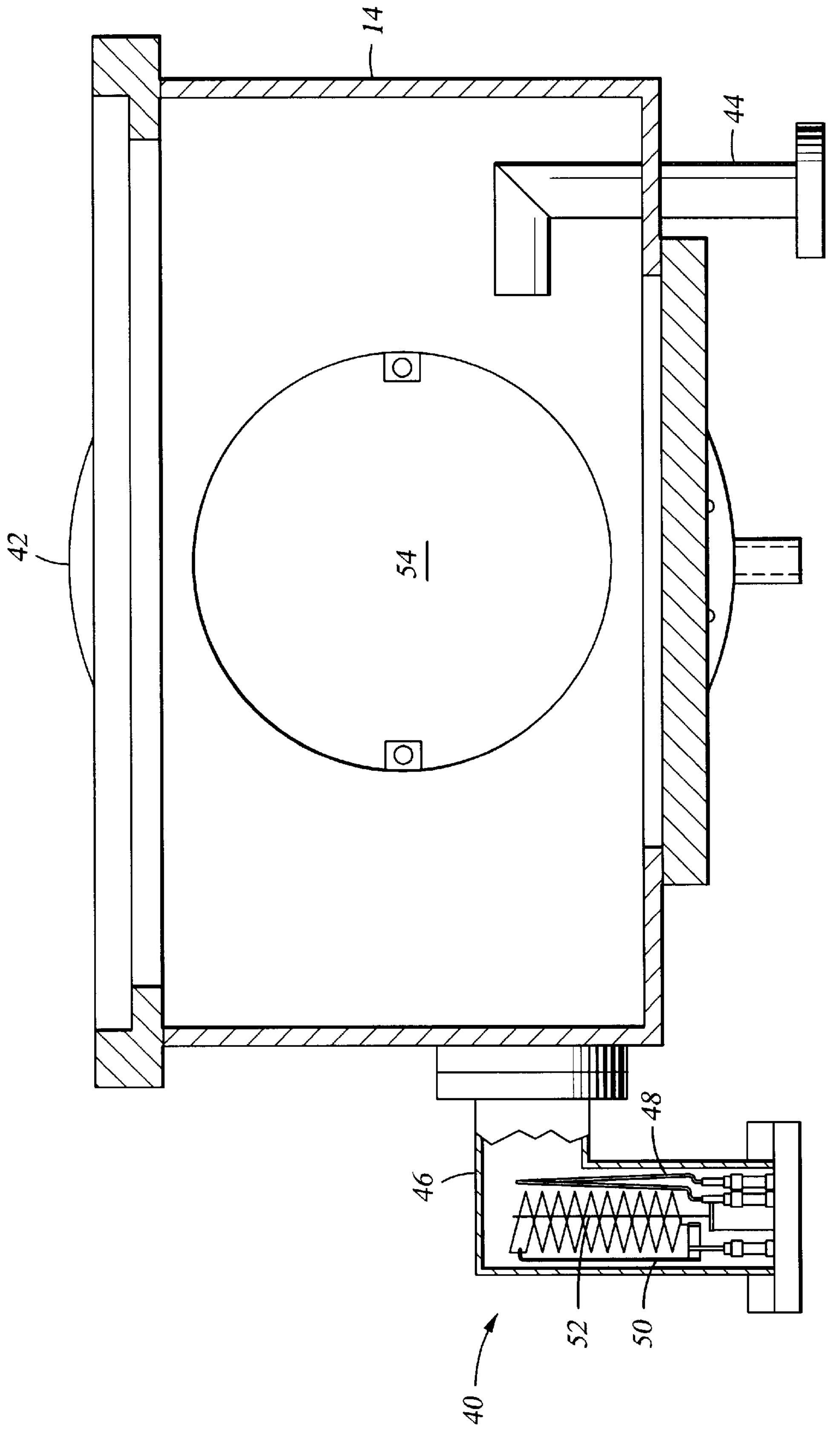
FIG. 3 is a vacuum chamber with an ion gauge and its adapter attached.

FIG. 3 shows a cross section of a vacuum chamber 14 without the pumps, but with an ion gauge 40. This figure is intended to represent a PVD chamber, but is it understood that any vacuum system is contemplated by the present invention. There is a port 42 for a cryopump and a port 44 for a roughing pump. Ion gauge 40 has a sleeve 46 that is open to the space 54 within chamber 14, so the vacuum can reach the gauge 40. Sleeve 46 may be a stainless steel tube installed to chamber 14 with a Conflat seal. The working parts of gauge 40 include a filament 48, a grid 50 and an ion collector 52. The apparatus, not shown, for actually manufacturing the integrated circuits will reside in the space 54 of the interior of chamber 14.

Figure 4:
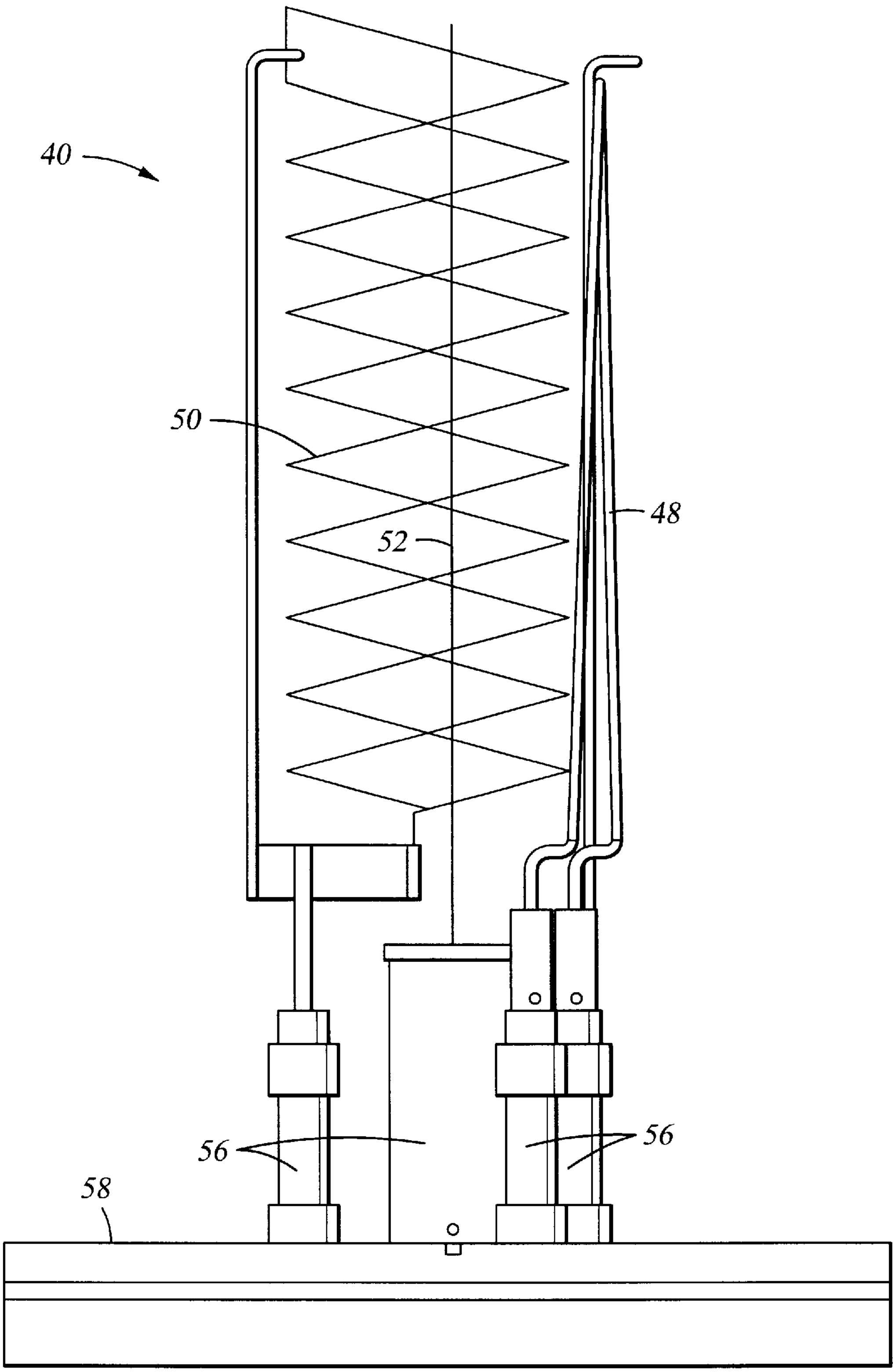
FIG. 4 is an ion gauge.

FIG. 4 shows an ion gauge without a cover on it so that filament 48, grid 50 and ion collector 52 are clearly visible. Insulators 56 insulate filament 48, grid 50 and ion collector 52 from metal flange 58. Metal flange 58 supports the working elements of the gauge 40.

Filament 48 may be biased at 30 volts DC and grid 50 may be biased at 180 volts DC with respect to the ground potential. When ion gauge 40 is turned on, a DC current flows through filament 48 and heats it to an extremely high temperature, about 1000° C., so that electrons are thermionically emitted from filament 48. The heated filament 48 emits free electrons at a constant controlled rate so that ionization of the surrounding gas may proceed at lower pressures. The heat of the filament may prevent most volatile contaminants from accumulating on gauge surfaces and makes the gauge self-cleaning. Filament 48 may be a hairpin-style cathode. The filament 48 may be thoria-coated iridium or tungsten. The thoria-coated iridium filament, however, is more common because it runs at a relatively lower temperature and is less reactive than the tungsten filament. Iridium, also, has a very high melting point, so it can operate effectively at the high temperatures to which it is subjected.

The potential difference between filament 48 and grid 50 causes the freed electrons to accelerate toward grid 50. Grid 50 is a helical anode which attracts electrons emitted by the heated filament 48. Grid 50 is biased at 180 VDC with respect to the ion collector 52. Thus, the electrons pass through grid 50, are attracted back, and are finally captured by grid 50. During this long path, the electrons ionize the gas molecules surrounding the grid 50.

The ion collector 52 is a third electrode, which attracts any positive ions produced in the gas surrounding the gauge. An ion gauge controller board, not shown, may receive a current signal from the ion collector, convert it to a voltage signal, and send it to an analog input channel to represent pressure.

Ion gauge 40 operates by thermionic emission. It measures pressure by emitting a flow of electrons from the heated filament 48. These electrons are accelerated towards grid 50 because of the potential difference between grid 50 and filament 48. When the freed electrons strike gas molecules and knock electrons loose from these molecules, positive ions are created. These ions are attracted to the wire ion collector 52. The ion current measured on collector 52 is directly proportional to the number of gas molecules in the anode volume, and therefore to the pressure of the gas.

An ion gauge power supply, not shown, may supply power to filament 48 and grid 50. The power supply may control the emission current circuit and the degas power. Degassing may remove contaminants on gauge surfaces by heating the gauge electrodes to high temperatures. Degassing may be done as needed or as a part of the regular pump-down sequence. Conventional wisdom used to be that if an ion gauge was contaminated, then it was because grid 50 had attracted too many molecules and needed to be heated to decontaminate it. It has since been discovered that it was filament contamination that was causing ion gauge failures.

The thoria coating on filament 48 reacts with water. This reaction is faster at higher temperatures. This reaction is also faster at higher pressures, since there is more water vapor in vacuum system 10 at higher pressures. Since water vapor and other gases may permeate through the O-ring under ultra high vacuum, this reactivity is of concern. Since filament 48 is heated to a very high temperature during operation, this reactivity may become a very serious problem. A filament 48 that has reacted very much with water vapor is contaminated and will not present an accurate pressure reading.

Part of the problem with water vapor contamination on filament 48 is that ion gauge adapter 46 may cause a cold spot within the bakeout structure of vacuum system 10. For example, the chamber 14 is usually warmed up to about 100° C. during bakeout testing, but the ion gauge adapter 46 is about 50° C., colder than chamber 14. Water vapor within chamber 14 may condense on this cold spot, causing the reactivity problems with ion gauge 40. The solution to this cold spot problem may be to keep ion gauge 40 warm by heating it with heating jacket 60 (see FIG. 5) sufficiently to evaporate water vapor in ion gauge adapter 46, but not so warm that the thoria reacts with water vapor faster. Thus, water vapor may not condense in ion gauge 40. A suitable heating jacket may be Watlow part number 04704883, available from Watlow Electric Manufacturing Co. of Columbia, Mo.

Figure 5:
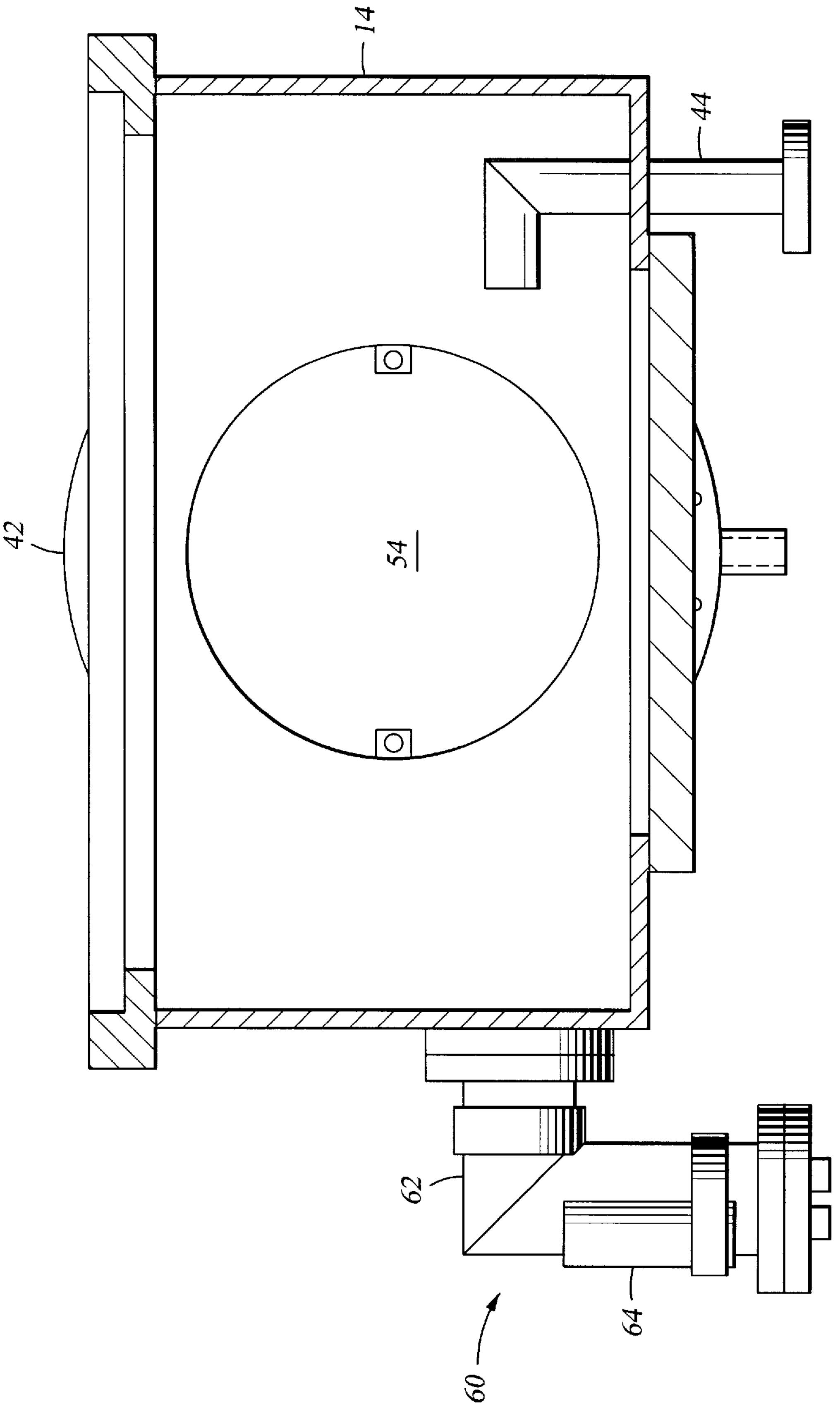
FIG. 5 is a vacuum chamber with an ion gauge attached and a heating jacket covering the ion gauge.
Figure 6B:
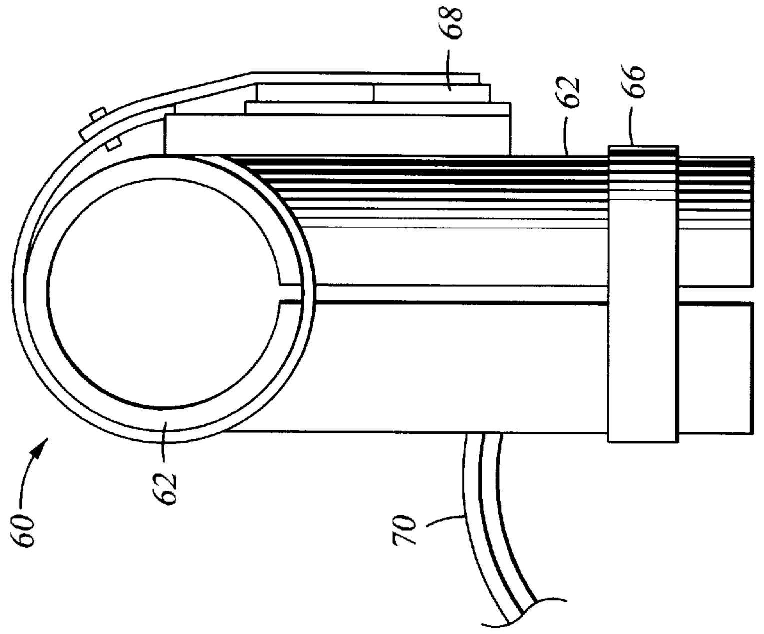
FIGS. 6*a* and 6*b* are views of a heating jacket.
Figure 6A:
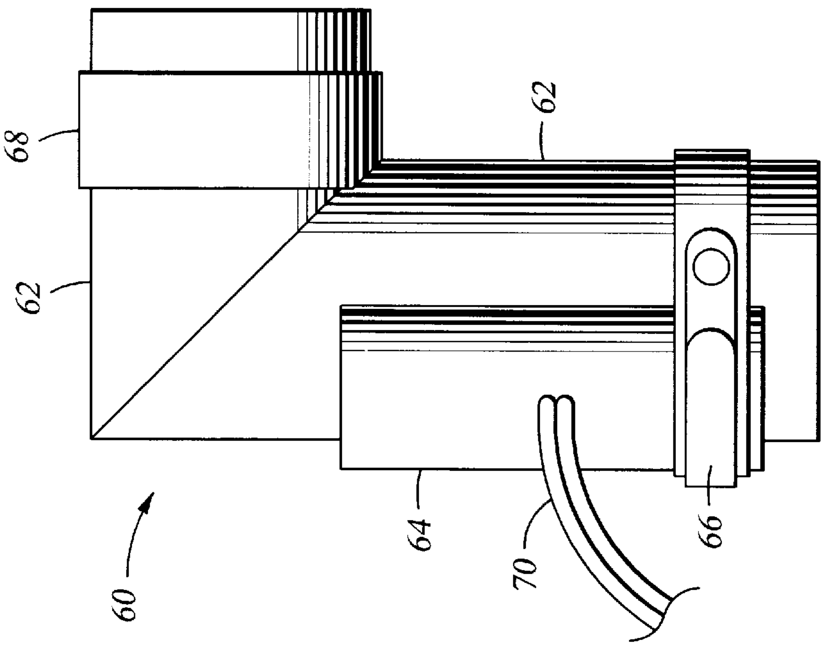

FIG. 5 shows the same cross section of FIG. 3, but with an ion gauge heating jacket 60 covering the ion gauge 40. FIGS. 6*a* (side) and 6*b* (front) show this heating jacket in isolation. This heating jacket 60 may have a flexible portion 62 made of silicon rubber and wrapped around ion gauge 40. A thermostat 64 may regulate the temperature of the flexible portion 62. Fastener straps 66, 68 may hold flexible portion 62 around ion gauge 40. Power cord 70 may provide electrical power to the heating jacket 60.

The heating jacket 60 may be used with the bakeout procedure described in the background to increase first-time yields after bakeout. However, the procedure below has been found to almost completely eliminate the ion gauge failure rate. Generally, since the contaminating chemical reactions in filament 48 are greatly exacerbated by high temperatures and high pressures, the procedure is to keep ion gauge 48 turned off for as much of the bakeout time as possible, especially during periods of high pressures and high temperatures.

The bakeout procedure starts with the roughing pump 22 pumping vacuum system 10 down for about five to ten minutes to a pressure of about 100 mtorr. Since this is a fairly high pressure, at which ion gauge 40 cannot yet operate, ion gauge 40 is left turned off during this period. Also, since the bakeout procedure is not considered to have started until the cryopump pumps the vacuum down as far as possible, the bakeout lamps 32 and wafer heater 34 are kept off. Thus, chamber 14 remains at about room temperature during this period. It may be advisable, however, for heating jacket 60 to be turned on during this time in order to make sure that condensation does not start to occur on the ion gauge.

Next, the pumping action is switched over to cryopump 20 to pump chamber 14 down for about ten to fifteen minutes to about $3.0\times10^{-6}$ torr. Since it is necessary to know when the vacuum reaches this pressure, ion gauge 40 must be turned on for a short period of time. It is not yet necessary, however, to turn on bakeout lamps 32 or wafer heater 34, so the temperature effects on ion gauge 40 and its filament 48 are minimized. Since the total bakeout time is considerably longer than the time required for the cryopump 20 to reduce the vacuum to this pressure, no substantial delay is caused by leaving the heating elements 32, 34 off during this time. Thus, the chamber temperature remains at about room temperature. Meanwhile, heating jacket 60 keeps ion gauge adapter 46 warm above the condensation point of water vapor.

When the pressure reaches the beginning bakeout pressure of about $3.0\times10^{-6}$ torr, ion gauge 40 is turned off, since it can be assumed that the pressure will hold properly, and since the bakeout lamps 32 are now turned on in order to heat chamber 14. Heating jacket 60 remains on to make sure that no condensation will occur while ion gauge 40 is off. This setup is maintained for about 24 hours. In other words, this procedure has reduced this part of the standard bakeout test from 32 hours to about 24.

By this time, much of the gases in the system have been removed, so the degassing rate within chamber 14 has slowed considerably. Since degassing occurs faster at higher temperatures, wafer bakeout heater 34 is turned on for about four hours in order to heat the vacuum system and assist the degassing. Experimental results have shown that four hours of bakeout with the heater 34 turned on is sufficient to finish out the degassing. Even though the higher temperature would enhance the degassing rate, the heater 34 should not be turned on at an earlier time because the heater 34, itself, could be damaged by reacting with the contaminants in the chamber 14. Ion gauge 40 must stay off since the temperature in chamber 14 will now be elevated to about 96° C. up to about 110° C., and since it may still be assumed that the pressure is rising slightly or holding.

After the required time for the bakeout process has passed, bakeout lamps 32 and wafer heater 34 are turned off to start the cool-down phase, which will take about twelve to fifteen hours. Ion gauge 40 is now turned on, since the pressure in chamber 14 is to be monitored to determine when the chamber reaches its qualifying pressure of about $6.0\times10^{-9}$ torr. Heating jacket 60 must be left on until the chamber temperature decreases low enough that the ion gauge adapter 46 will no longer be a cold spot problem. Fifty degrees C. is a sufficient temperature at which the heating jacket 60 may be turned off.

Figure 7:
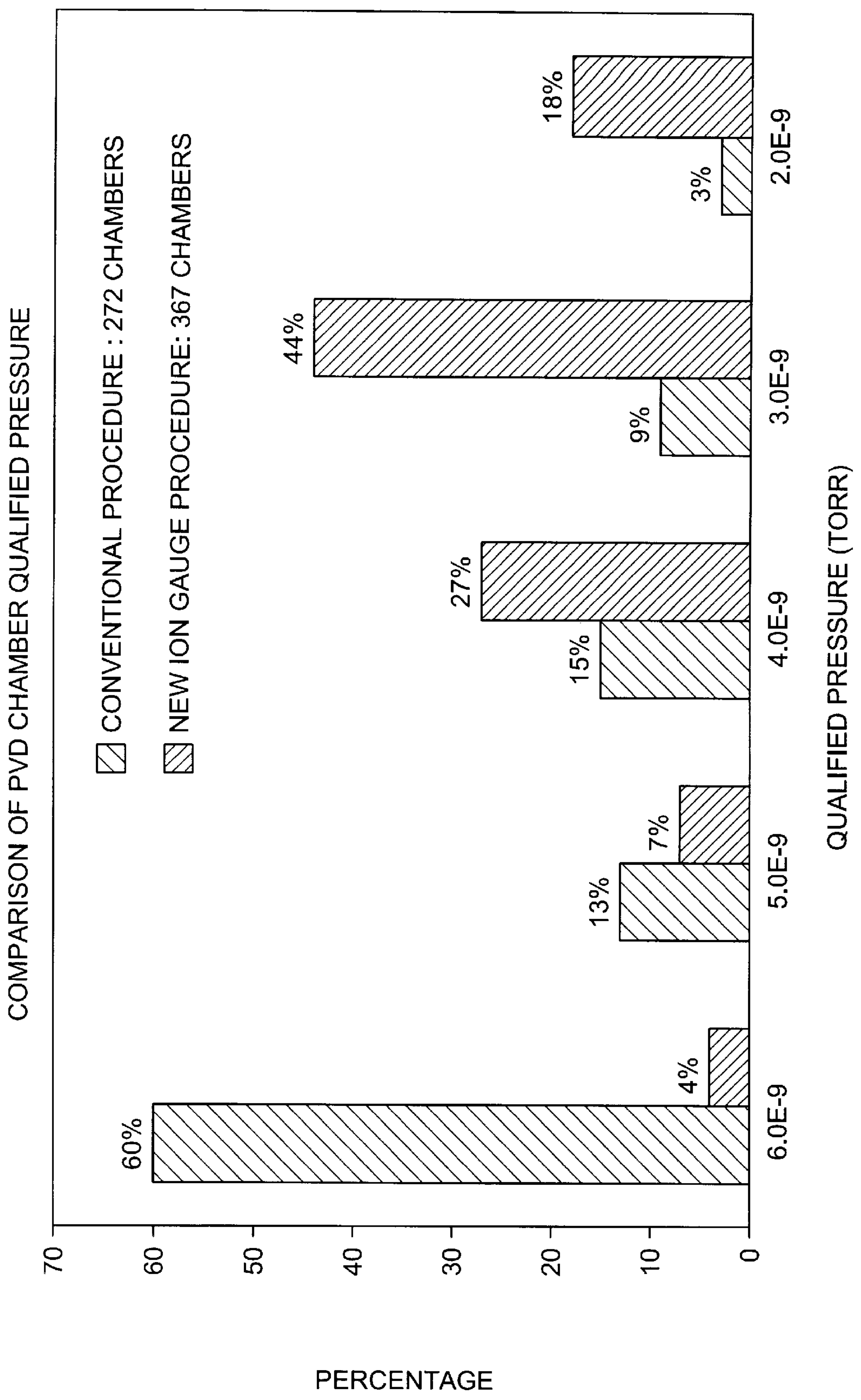
FIG. 7 is a chart comparing the qualifying pressures of vacuum systems using different bakeout procedures.

An additional benefit from the above procedure has been that the pressures at which vacuum chambers have actually qualified have become significantly better. FIG. 7 shows a chart of the pressures at which vacuum chambers qualified. For these tests, 272 chambers were tested under the conventional, or standard, procedure; and 367 chambers were tested under the above described procedure. Under the standard procedure, the vast majority just managed to qualify at the minimum qualifying pressure of $6.0\times10^{-9}$ torr, while only a few managed to qualify at lower pressures. Under the above procedure, however, more than half of the chambers qualified at a pressure as low as $3.0\times10^{-9}$ torr or better, half the specified minimum qualifying pressure.

While the foregoing is directed to the preferred embodiment of the present invention, other and further embodiments of the invention may be devised without departing from the basic scope thereof, and the scope thereof is determined by the claims which follow.

I claim:

1. A method of testing a vacuum system having a chamber, a high vacuum pump and a pressure gauge, comprising:

pumping the chamber to a high vacuum;

turning the pressure gauge on during a first period of high vacuum;

turning the pressure gauge off during a second period of high vacuum;

activating a chamber heating element during the second period of high vacuum; and turning the pressure gauge on again after the second period of high vacuum until the vacuum chamber reaches a qualifying pressure.

2. The method of claim 1, wherein the chamber heating element is bakeout lamp disposed within the chamber.

3. The method of claim 1, further comprising activating a wafer heater during the second period of high vacuum.

4. The method of claim 1 wherein the pressure gauge is off when the heating element is activated.

5. The method of claim 1, wherein the heating element is deactivated at least part of the time when the pressure gauge is on.

6. The method Of claim 1 further comprising heating the pressure gauge using a gauge heater thermally attached to the pressure gauge.

7. The method of claim 1, wherein the chamber is maintained below a threshold temperature during the first period of high vacuum.

8. The method of claim 1, wherein the pressure gauge is an ion gauge.

9. The method of claim 6 wherein the gauge heater is turned off after the chamber cools below a threshold temperature.

10. The method of claim 3, wherein the wafer heater is activated during a latter portion of the second period of high vacuum.

11. A method of testing a vacuum system having a chamber, a pressure gauge and a heating element capable of being turned off and on during different periods of the test, the method comprising:

pumping the chamber to a high vacuum;

activating the pressure gauge for an initial period while the heating element is off:

turning the heating element on for one or more periods;

turning the pressure gauge on during at least one of the periods when the heating element is off; and turning the pressure gauge off during at least one of the periods when the heating element is on.

12. The method of claim 11, wherein the heating element is a bakeout lamp.

13. The method of claim 11, wherein the heating element is a wafer heater.

14. The method of claim 11 wherein the heating element is off and the pressure gauge is turned on during a first high vacuum period.

15. The method of claim 14 wherein the heating element is off and the pressure gauge is turned off prior to the first high vacuum period.

16. The method of claim 14 wherein the heating clement is turned on and the pressure gauge is turned off during a second period of high vacuum.

17. The method of claim 16, further comprising activating a wafer heater during the second period of high vacuum.

18. The method of claim 16 further comprising turning the heating element off and turning the pressure gauge on during a third period of high vacuum.

19. The method of claim 11, further comprising heating the pressure gauge.

20. The method of claim 18 further comprising heating the pressure gauze until a cool-down period, the cool-down period being a period when the heating element is off and the pressure gauge is turned on.

21. The method of claim 20 wherein the cool-down period is the third period of high vacuum and the chamber has cooled below about 50° C.

22. A method of testing a vacuum system having a chamber, a pressure gauge and a heating jacket thermally attached to the pressure gauge, comprising:

pumping the chamber to a low pressure:

turning the heating jacket on; and activating the pressure gauge while the heating jacket is on.

23. The method of claim 22 further comprising:

deactivating the pressure gauge; and performing a chamber bakeout.

24. The method of claim 23, further comprising:

activating the pressure gauge after the chamber bakeout; and turning off the heating jacket after the chamber cools below a condensation temperature.

25. The method of claim 23 wherein the chamber bakeout comprises:

heating the chamber using bakeout lamps.

26. The method of claim 24 wherein the pressure gauge is activated during a first period in which the chamber is pumped to a pressure between about 100 mtorr and about $3.0\times10^{-6}$ torr.

27. The method of claim 26 wherein the chamber bakeout is performed by heating the chamber to a temperature between about 96° C. and about 110° C.

28. The method of claim 24 wherein the pressure gauge is heated by the heating jacket to a temperature above a condensation temperature of water vapor in the chamber.

29. The method claim 28 wherein the condensation temperature is at about 50° C.

30. The method of claim 1 wherein a chamber pressure during the first period of high vacuum is between about 100 mtorr and about $3.0\times10^{-6}$ torr.

31. The method of claim 1 wherein the chamber is heated by the chamber heating element to a bakeout temperature between about 96° C. and about 110° C.

32. The method of claim 1 wherein the chamber qualifies when the chamber reaches a pressure below about $6\times10^{-6}$ torr.

33. The method of claim 6 wherein the pressure gauge is heated to a temperature above a condensation temperature of water vapor in the chamber.

34. The method of claim 9 wherein the threshold temperature is about 50° C.

35. The method of claim 16 wherein a chamber pressure during the first period of high vacuum is between about 100 mtorr and about $3.0\times10^{-6}$ torr.

36. The method of claim 16 wherein the chamber is heated by the heating element to a bakeout temperature between about 96° C. and about 110° C.

37. The method of claim 21 wherein the pressure gauge is heated to a temperature above a condensation temperature of water vapor in the chamber.

* * * * *

UNITED STATES PATENT AND TRADEMARK OFFICE

CERTIFICATE OF CORRECTION

PATENT NO. : 6,054,862
DATED : April 25, 2000
INVENTOR(S) : Zhou

It is certified that error appears in the above-identified patent and that said Letters Patent is hereby corrected as shown below:

Column 8,
Line 26, after "off", please replace ":" with --;--.

Column 10,
Line 8, after "about", please replace "$6x10^{-6}$" with --$6x10^{-9}$"--.

Signed and Sealed this

Seventeenth Day of July, 2001

Attest:

Nicholas P. Godici

NICHOLAS P. GODICI

*Attesting Officer* *Acting Director of the United States Patent and Trademark Office*